United States Patent
Chiang

(10) Patent No.: US 8,354,762 B2
(45) Date of Patent: Jan. 15, 2013

(54) SPRING PLATE AND VOICE COIL MOTOR USING THE SAME

(75) Inventor: Shun-Fan Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 321 days.

(21) Appl. No.: 12/829,439

(22) Filed: Jul. 2, 2010

(65) Prior Publication Data

US 2011/0156502 A1 Jun. 30, 2011

(30) Foreign Application Priority Data

Dec. 30, 2009 (TW) .............................. 98145723 A

(51) Int. Cl.
- *H02K 33/00* (2006.01)
- *H02K 35/00* (2006.01)
- *H02K 5/00* (2006.01)

(52) U.S. Cl. ............... 310/38; 310/21; 310/29; 310/32; 310/75 A; 310/89; 359/823; 359/824; 381/396; 381/398; 381/400

(58) Field of Classification Search ................. 359/823, 359/824; 381/396, 398, 400; 310/21, 29, 310/32, 38, 75 A, 89; *H02K 33/00, 35/00, H02K 5/00*
See application file for complete search history.

(56) References Cited

U.S. PATENT DOCUMENTS

| | | | | |
|---|---|---|---|---|
| 5,289,318 A * | 2/1994 | Sekine et al. | ................. | 359/813 |
| 5,572,372 A * | 11/1996 | Sekine et al. | ................. | 359/824 |
| 7,082,668 B2 * | 8/2006 | Ando et al. | ..................... | 29/594 |
| 7,316,289 B2 * | 1/2008 | Ajiki et al. | ..................... | 181/171 |
| 7,602,439 B2 * | 10/2009 | Makii et al. | .................... | 348/374 |
| 7,663,818 B2 * | 2/2010 | Chung | .......................... | 359/814 |
| 7,663,823 B2 * | 2/2010 | Chung | .......................... | 359/824 |
| 7,706,088 B2 * | 4/2010 | Chung | .......................... | 359/823 |
| 7,715,131 B2 * | 5/2010 | Chou et al. | ..................... | 359/824 |
| 7,731,003 B2 * | 6/2010 | Su et al. | ........................ | 188/162 |
| 2007/0205674 A1 * | 9/2007 | Tseng et al. | .................... | 310/14 |
| 2008/0174889 A1 * | 7/2008 | Su et al. | ....................... | 359/824 |
| 2008/0192124 A1 * | 8/2008 | Nagasaki | ................. | 348/208.11 |
| 2008/0259470 A1 * | 10/2008 | Chung | .......................... | 359/823 |
| 2009/0128931 A1 * | 5/2009 | Matsumoto | .................... | 359/823 |
| 2010/0098394 A1 * | 4/2010 | Ishihara et al. | ................. | 396/55 |
| 2010/0128372 A1 * | 5/2010 | Wang | ............................ | 359/824 |
| 2010/0142065 A1 * | 6/2010 | Liao | ............................. | 359/824 |
| 2011/0156502 A1 * | 6/2011 | Chiang | ........................... | 310/38 |

* cited by examiner

*Primary Examiner* — John K Kim
(74) *Attorney, Agent, or Firm* — Altis Law Group, Inc.

(57) ABSTRACT

A spring plate includes an engaging portion, a connecting portion, a first elastic portion, a second elastic portion, a first fixing portion, and a second fixing portion. The first elastic portion and the second elastic portion are connected to the engaging portion and the connecting portion, the first fixing portion and the second fixing portion are formed on opposite ends of the connecting portion. The engaging portion defines a recess. The present disclosure further provides a voice coil motor using the spring plate.

20 Claims, 7 Drawing Sheets

SPRING PLATE AND VOICE COIL MOTOR USING THE SAME

BACKGROUND

1. Technical Field

The present disclosure generally relates to a spring plate, and more particularly, relates to a voice coil motor using the spring plate.

2. Description of Related Art

As digital technology develops, the volume and weight of digital cameras become smaller, thus the cameras are portable for users. However, with the reduced volume and weight, camera shake happens easily when the user holds the camera to take photos. Therefore, fuzzy images are taken.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
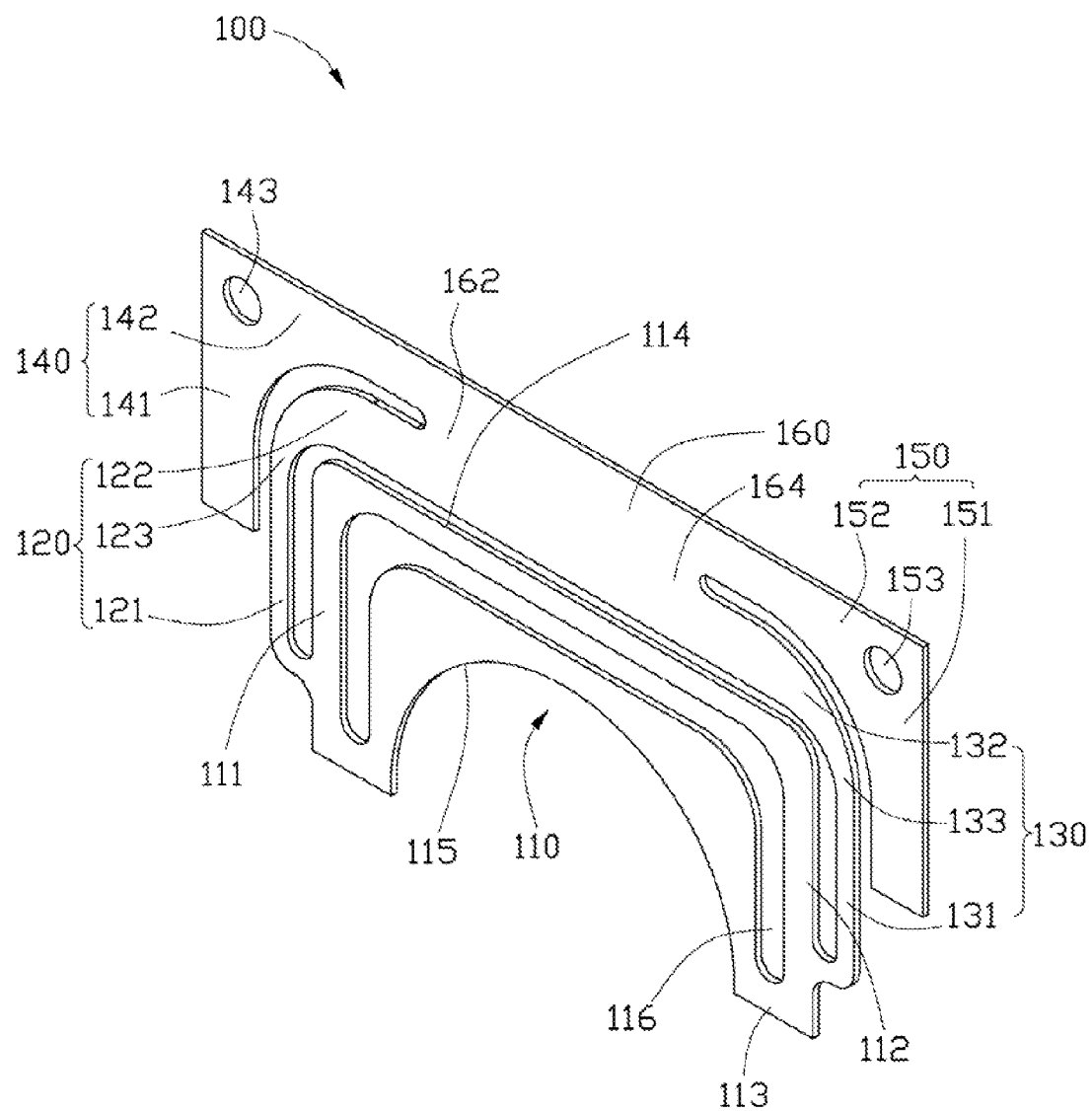
FIG. 1 is an isometric view of an embodiment of a spring plate.
Figure 2:
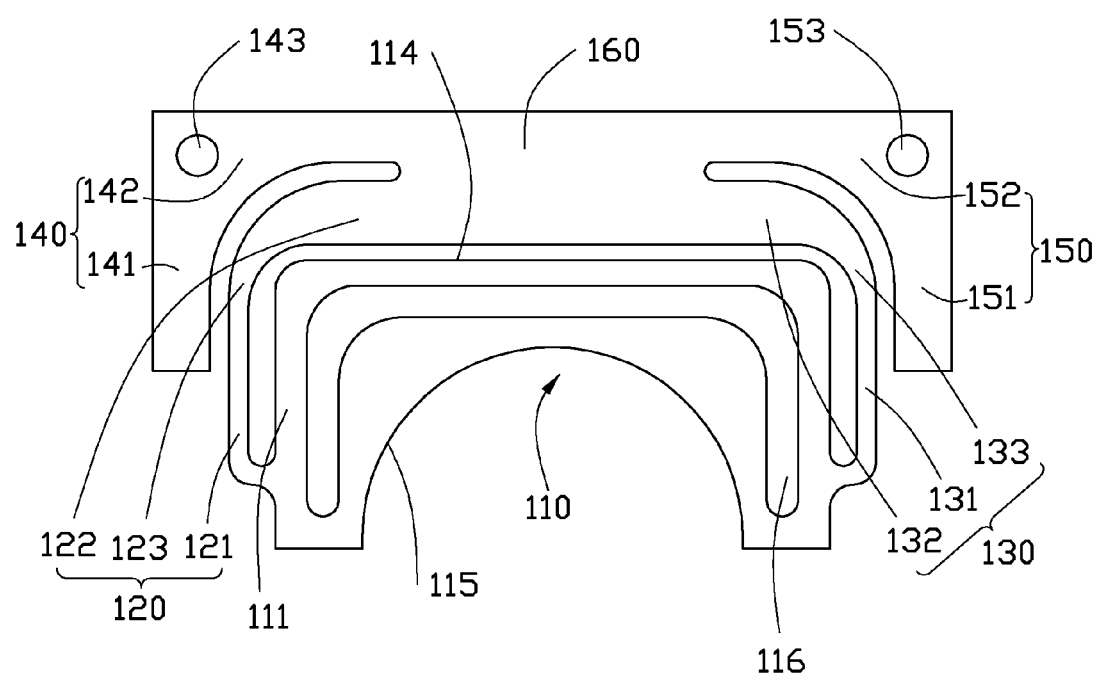
FIG. 2 is a plan view of the spring plate of FIG. 1.

Referring to FIGS. 1 and 2, an embodiment of a spring plate 100 includes an engaging portion 110, a first elastic portion 120, a second elastic portion 130, a first fixing portion 140, a second fixing portion 150, and a connecting portion 160 connecting the first fixing portion 140 and the second fixing portion 150. The engaging portion 110, the first elastic portion 120, the second elastic portion 130, the first fixing portion 140, and the second fixing portion 150 are in a same plane. The connecting portion 160 has a first end 162 and a second end 164. The first end 162 and the second end 164 are positioned at opposite ends of the connecting portion 160.

The engaging portion 110 is positioned between the first elastic portion 120 and the second elastic portion 130 in the illustrated embodiment. The engaging portion 110 is a substantially rectangular board including a first edge 111 a second edge 112 facing the first edge 111, a third edge 113 extending along a longitudinal direction of the engaging portion 110, and a fourth edge 114 facing the third edge 113. The engaging portion 110 further defines a substantially semicircular recess 115 recessed from the third edge 113 towards the fourth edge 114. In the embodiment shown in FIG. 2, the engaging portion 110 further defines a substantially U-shaped hole 116, thus the weight of the spring plate 100 and the material cost is reduced.

The first elastic portion 120 is positioned between the engaging portion 110 and the first fixing portion 140. The first elastic portion 120 includes a first elastic part 121, as second elastic part 122. and a first connecting part 123 between the first and the second elastic parts 121, 122. The extending directions of the first and the second elastic parts 121, 122 are substantially perpendicular to each other. The majority of the first elastic part 121 faces the first edge 111 of the engaging portion 110, and one end of the first elastic part 121 is connected to the first edge 111. The second elastic part 122 faces the fourth edge 114 and one end thereof is connected to the first end 162 of the connecting portion 160.

The second elastic portion 130 is positioned between and connects the engaging portion 110 and the second fixing portion 150. The second elastic portion 130 includes a third elastic part 131, a fourth elastic part 132, and a second connecting part 133 connecting the third and the fourth elastic parts 131, 132. The third and the fourth elastic parts 131, 132 are substantially perpendicular to each other. The majority of the third elastic part 131 faces the second edge 112 of the engaging portion 110, and one end of the third elastic part 131 connects to the second edge 112. The fourth elastic part 132 faces the fourth edge 114 and is connected to the second end 164 of the connecting portion 160. In the embodiment shown in FIG 1, the second connecting part 133 connects the third and the fourth elastic parts 131, 132.

The first and the second fixing portions 140, 150 are connected to opposite ends of the connecting portion 160, respectively. The first fixing portion 140 is also connected to the first elastic portion 120, and the second fixing portion 150 is also connected to the second elastic portion 130. The first fixing portion 140 includes a first fixing part 141 and a second fixing part 142 that are connected and substantially perpendicular to each other. The first fixing part 141 faces the first edge 111 of the engaging portion 110, and the second fixing part 142 faces the fourth edge 114 thereof. The second fixing portion 150 includes a third fixing part 151 and a fourth fixing part 152 connected and substantially perpendicular to each other. The third fixing part 151 faces the second edge 112 of the engaging portion 110, and the fourth fixing part 152 faces the fourth edge 114 thereof. In the embodiment shown in FIG. 1, the first fixing portion 140 defines a first fixing hole 143, and the second fixing portion 150 defines a second fixing hole 153.

In the spring plate 100, the first fixing portion 140 and the second fixing portion 150 are substantially symmetrical relative to a center axis of the engaging portion 110, and the first elastic portion 120 and the second elastic portion 130 are also substantially symmetrical relative to the center axis of the engaging portion 110.

Referring to FIGS. 3 through 7, a voice coil motor 300 includes a fixing assembly 310, a movable assembly 320, the spring plate 100, a first magnetic assembly 341, a second magnetic assembly 351, a third magnetic assembly 342, a fourth magnetic assembly 352, a fifth magnetic assembly 343, a sixth magnetic assembly 353, and a rolling member 360. The spring plate 100 is connected to the fixing assembly 310 and the movable assembly 320, and the rolling member 360 is rotatably positioned between and contacts with the fixing assembly 310 and the movable assembly 320.

The fixing assembly 310 includes a fixing frame 311 and a fixing board 312.

The fixing frame 311 includes a first sidewall 3111, a second sidewall 3112, a third sidewall 3113, a fourth sidewall 3114, and a receiving space 3115 formed thereof. The first sidewall 3111 faces the second sidewall 3112, and the third sidewall 3113 faces the fourth sidewall 3114. The second sidewall 3112 defines a first receiving hole 3116 in a center portion thereof, the third sidewall 3113 defines a second receiving hole 3117 in a center portion thereof, and the fourth sidewall 3114 defines a third receiving hole 3118 in a center portion thereof.

The fixing board 312 is fixed on the fixing frame 311, and the fixing board 312 is used for fixing the spring plate 100 on the fixing frame 311 and used for engaging with the rolling member 360. The fixing board 312 defines a hemispherical first receiving recess 3121 to receive the rolling member 360.

The movable assembly 320 includes a receiving frame 321 and a connecting board 322 fixed on the receiving frame 321.

The receiving frame 321 is received in the first receiving space 3115 of the fixing assembly 310. The receiving frame 321 includes a first side plate 3211, a second side plate 3212, a third side plate 3213, a fourth side plate 3214, a top plate 3215, and a second receiving space 3216 formed thereof. The second receiving space 3216 is used for receiving elements, such as lenses or a lens module, driven by the voice coil motor 300. The first side plate 3211 faces the first sidewall 3111 of the fixing frame 311 of the fixing assembly 310, the second side plate 3212 faces the second sidewall 3112, the third side plate 3213 faces the third sidewall 3113, and the fourth side plate 3214 faces the fourth sidewall 3114.

Figure 4:
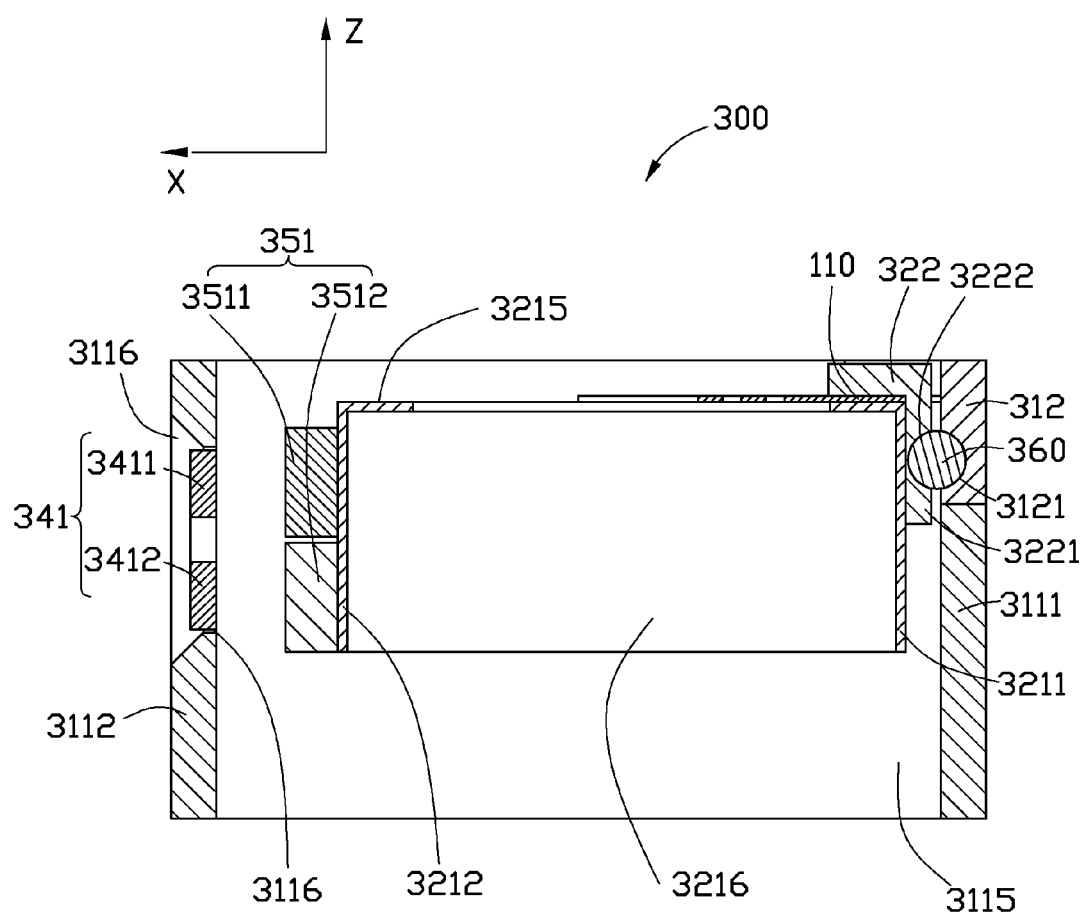
FIG. 4 is a cross-section of the voice coil motor of FIG. 3, taken along line IV-IV thereof.
Figure 5:
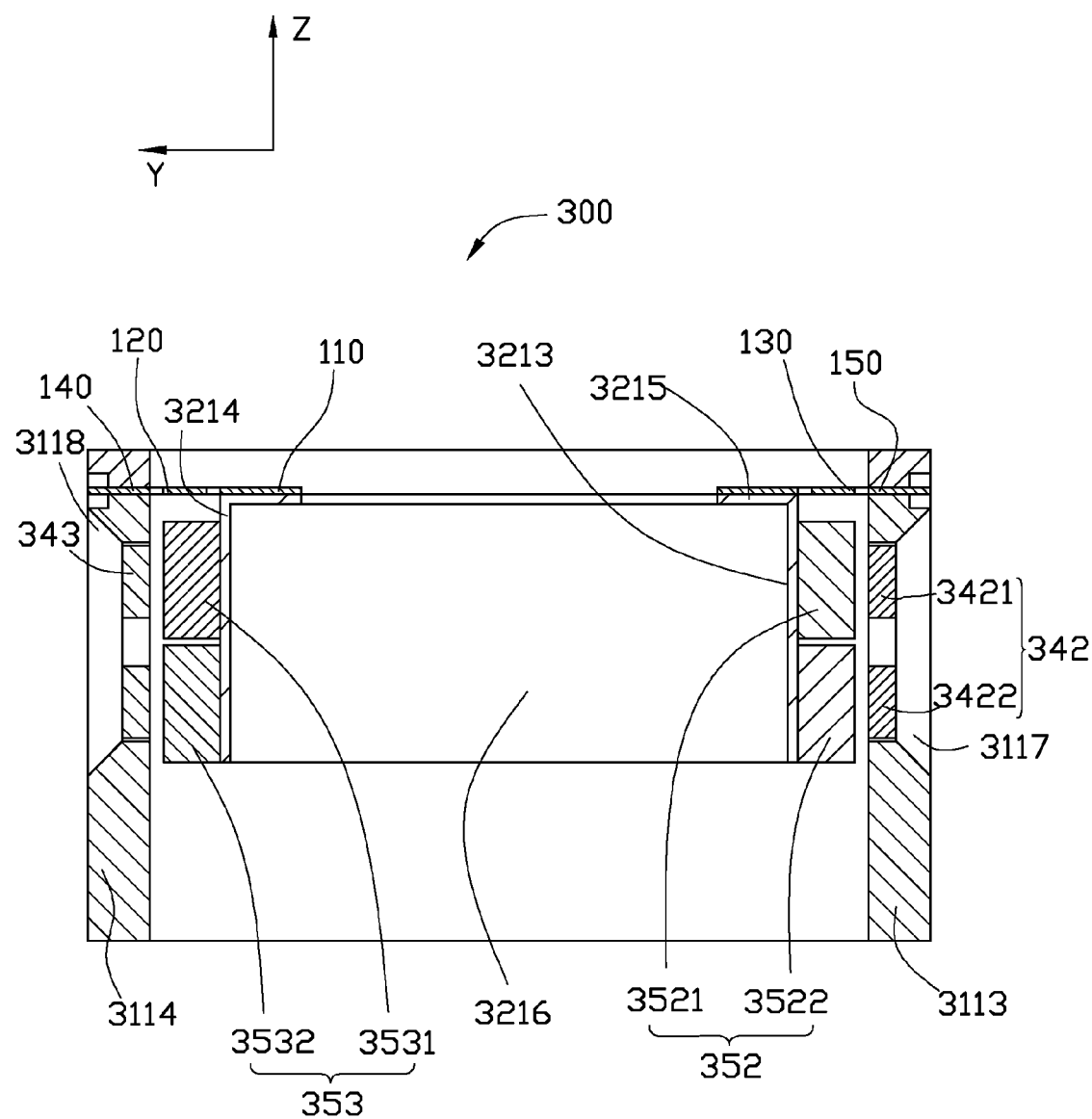
FIG. 5 is a cross-section of the voice coil motor of FIG. 3, taken along line
V-V thereof.
Figure 6:
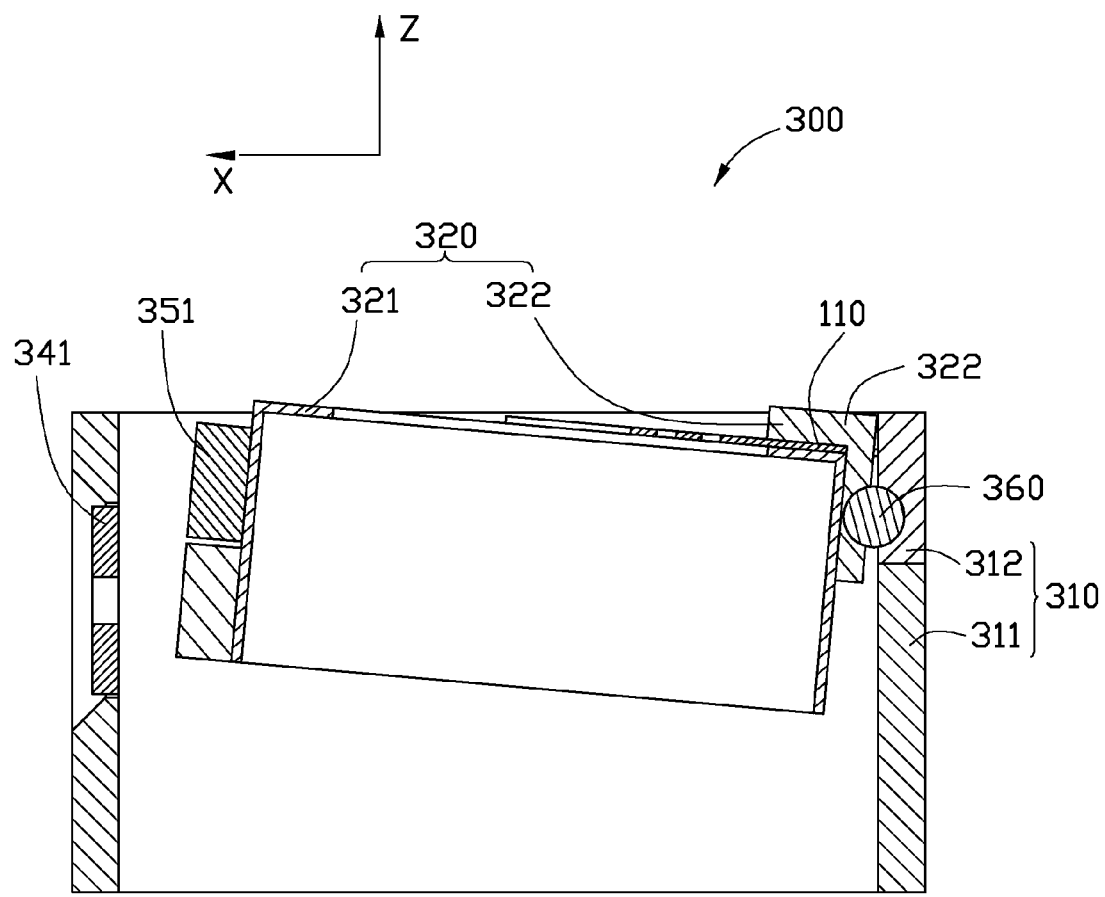
FIG. 6 is similar to FIG. 4, but showing another state of the voice coil motor.
Figure 7:
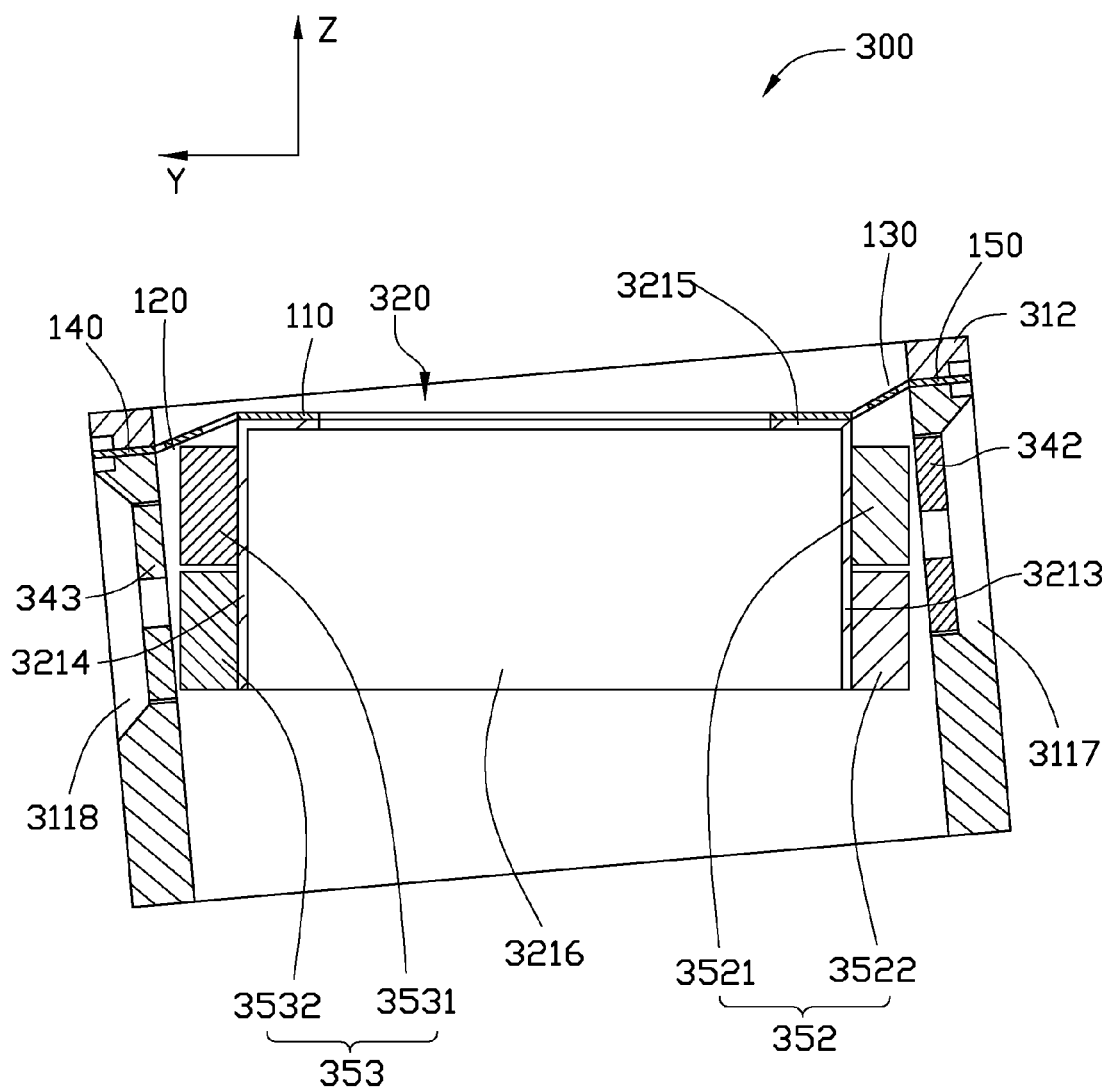
FIG. 7 is similar to FIG. 5, but showing another state of the voice coil motor.

In the embodiment shown in FIG. 4, the connecting board 322 is fixed on the top plate 3215 and the first side plate 3211 of the receiving frame 321. The connecting board 322 includes a connecting part 3221 between the first side plate 3211 of the receiving frame 321 and the first sidewall 3111 of the fixing frame 311, and a gap is formed between the connecting part 3221 and the first sidewall 3111 of the receiving frame 321. The connecting part 3221 defines a hemispherical second receiving recess 3222 which has a substantially equal volume with the first receiving recess 3121 in the fixing board 312.

Alternatively, the first receiving recess 3121 may be defined in the first sidewall 3111 of the fixing frame 311, and the second receiving recess 3222 is defined in the first side plate 3211 of the receiving frame 321.

The engaging portion 110 of the spring plate 100 is fixed on the movable assembly 320, therefore, a center axis of the fixing assembly 310 is perpendicular to the engaging portion 110 of the spring plate 100. A three-dimension coordinate system with three axes X, Y, Z perpendicular to each other is established, and the spring plate 100 is in a plane defined by the axes X and Y. The width direction of the engaging portion 110 of the spring plate 100 is parallel to the X axis.

Figure 3:
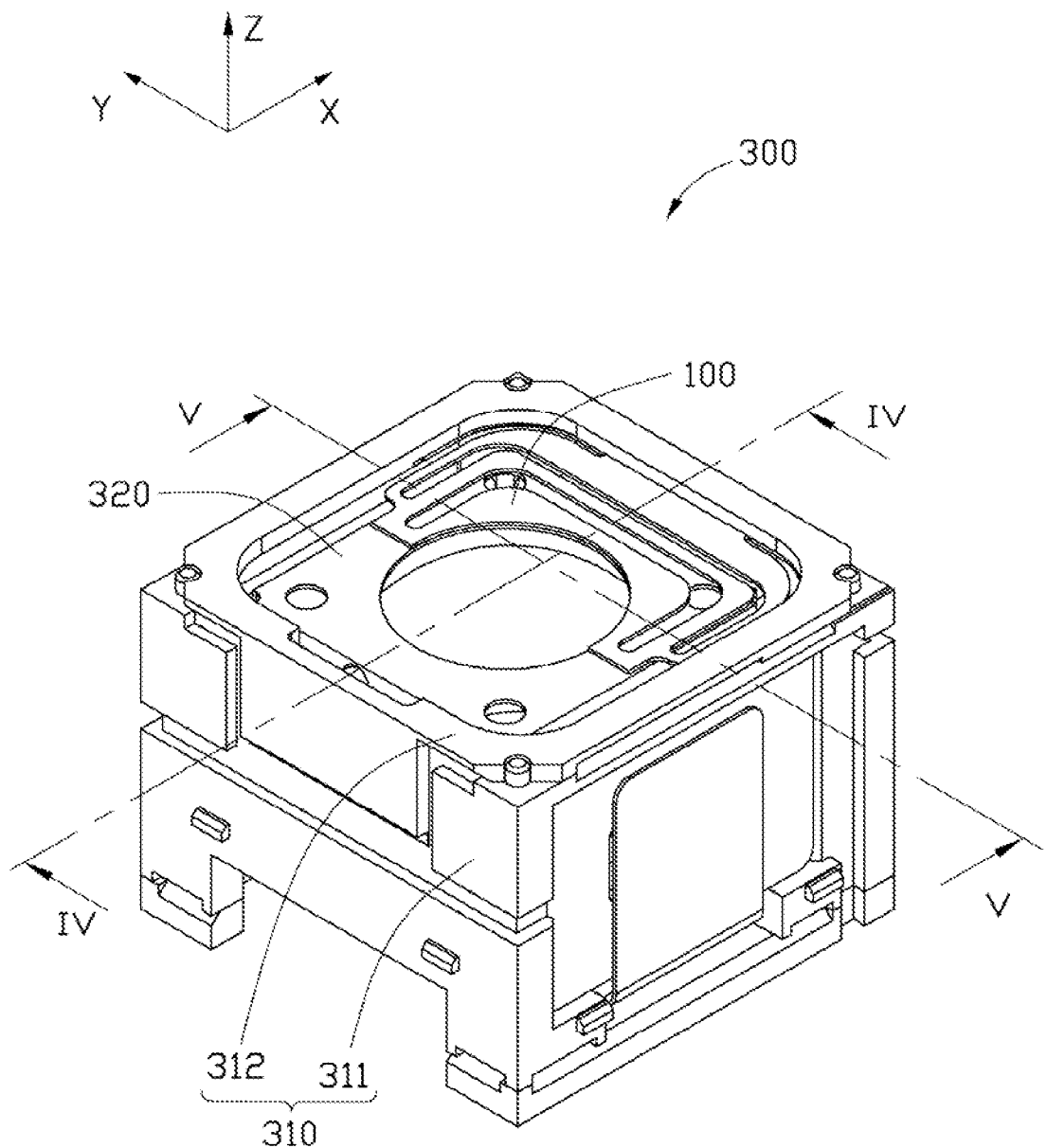
FIG. 3 is an assembled, isometric view of an embodiment of a voice coil motor using the spring plate of FIG. 1.

In the embodiment shown in FIG. 3, the first fixing portion 140 is fixed, on an upper surface (not label) of the fixing frame 311 of the fixing assembly 310. Specifically, the first fixing part 141 of the fixing portion 140 is fixed on a portion of the upper surface corresponding to the third sidewall 3113. and the second fixing part 142 is fixed on the upper surface corresponding to the first sidewall 3111 adjacent to the third sidewall 3113. The second fixing portion 150 is also fixed on the upper surface.

Specifically, the third fixing part 151 of the second fixing portion 150 is fixed on a portion of the upper surface corresponding to the fourth sidewall 3114, and the fourth fixing part 152 is fixed on the upper surface corresponding to the first sidewall 3111 adjacent to the forth sidewall 3114.

The first magnetic assembly 341, the third magnetic assembly 342, and the fifth magnetic assembly 343 are electromagnet which are fixed on the second sidewall 3112, the third sidewall 3113, and the fourth sidewall 3114 of the fixing frame 311, respectively. Furthermore, axes of the first, third, and fifth magnetic assemblies 341, 342, and 343 are perpendicular to the second, third, and fourth sidewalls 3112, 3113, and 3114, respectively. In the embodiment shown in FIG. 4, the first magnetic assembly 341 is received and fixed in the first receiving hole 3116 in the second sidewall 3112 of the fixing frame 311. The third magnetic assembly 342 is received and fixed in the second receiving hole 3117 in the third sidewall 3113 of the fixing frame 311. The fifth magnetic assembly 343 is received and fixed in the third receiving hole 3118 in the fourth sidewall 3114 of the fixing frame 311.

The first magnetic assembly 341 faces the second magnetic assembly 351 and includes a first part 3411 over the center axis thereof and a second part 3412 below. In use, an electrical current flows in one direction in the first part 3411 and a current in the second part 3412 flows in the opposite direction.

The second magnetic assembly 351 is fixed on the second side plate 3212 of the receiving frame 321 of the movable assembly 320. The second magnetic assembly 351 includes a first magnet 3511 and a second magnet 3512 facing the first and second parts 3411, 3412 of the first magnetic assembly 341, respectively. The first and second magnets 3511, and 3512 are positioned in a direction parallel to axis Z, and a magnetic field of the first magnet 3511 is contrary to a magnetic field of the second magnet 3512. In the embodiment shown in FIG. 4, a south pole of the first magnet 3511 is adjacent to the second side plate 3212, but a north pole of the second magnet 3512 is adjacent to the second side plate 3212. Alternatively, the first magnet 3511 can be positioned with its south pole away from the second side plate 3212, and the second magnet 3512 is positioned with its north pole away from the second side plate 3212, correspondingly. The second magnetic assembly 351 and the first magnetic assembly 341 generate a magnetic force therebetween parallel to the Z axis.

Since currents in the first and second parts 3411, 3412 of the first magnetic assembly 341 flow in opposite directions, and the magnetic fields of the first magnet 3511 and the second magnet 3512 are contrary at the same time, and a force acting on the first magnet 3511 is in a same direction with a force acting on the second magnet 3512.

The third magnetic assembly 342 faces the fourth magnetic assembly 352. The third magnetic assembly 342 includes a third part 3421 over a center axis thereof and a fourth part 3422 below. In use, currents in the third part 3421 and the fourth part 3422 also flow in opposite directions.

The fourth magnetic assembly 352 is fixed on the third side plate 3213 of the receiving frame 321. The fourth magnetic assembly 352 includes a third magnet 3521 facing the third part 3421 and a fourth magnet 3522 facing the fourth part 3422 of the third magnetic assembly 342. The third magnet 3521 and the fourth magnet 3522 are positioned in a direction parallel to the Z axis, and a magnetic field of the third magnet 3521 is contrary to a magnetic field of the fourth magnet 3522. Since currents in the third and the fourth parts 3421, 3422 of the third magnetic assembly 342 are in opposite directions, and the magnetic fields of the third magnet 3521 and the fourth magnet 3522 are contrary at the same time, a force acting on the third magnet 3521 is in a same direction with a force acting on the fourth magnet 3522.

The fifth magnetic assembly 343 and the sixth magnetic assembly 353 face each other. The fifth magnetic assembly 343 is capable of acting a force parallel to the Z axis when the fifth magnetic assembly 343 is in use. Alternatively, the fifth and the sixth magnetic assemblies 343, 353 may be omitted.

The rolling member 360 is received between the fixing assembly 310 and the movable assembly 320, thus the movable assembly 320 is capable of rotating around the rolling member 360 relative to the fixing assembly 310. In the embodiment shown in FIG. 4, the rolling member 360 is a spherical ball which is received in the first receiving recess 3121 of the fixing board 312 and the second receiving recess 3222 of the connecting board 322. When the second magnetic assembly 351 is pushed by a force parallel to the Z axis, the movable assembly 320 can rotate around the Y axis relative to the fixing assembly 310. When the fourth magnetic assembly 352 and the sixth magnetic assembly 353 are pushed by contrary forces parallel to the Z axis, the movable assembly 320 can rotate around the X axis relative to the fixing assembly 310.

Alternatively, the rolling member 360 may be a shaft positioned along the Y axis, therefore, the movable assembly 320 is capable of rotating around the Y axis. The third magnetic assembly 342, the fourth magnetic assembly 352, the fifth magnetic assembly 343, and the sixth magnetic assembly 353 are omitted.

Referring to FIGS. 1-3 and 7, during the rotation of the movable assembly 320 around axis X, the engaging portion 110 of the spring plate 100 rotates with the movable assembly 320 at the same time, thereby, the first and the second elastic portions 120, 130 of the spring plate 100 are deformed and generate elastic forces in opposite directions. The elastic forces may cause the engaging portion 110 to move back to the initial state.

When the movable assembly 320 rotates relative to the fixing assembly 310 in the magnetic force between the third magnetic assembly 342 and the fourth magnetic assembly 353, the engaging portion 110 of the spring plate 100 rotates relative to the first and the second fixing portions 140, 150. During the rotation of the engaging portion 110, the first and the second elastic portions 120, 130 are deformed and generate elastic forces acting on the first edge 111 and the second edge 112 of the engaging portion, therefore, the engaging portion 110 can be driven to initial state.

In the spring plate 100, the first and the second elastic portions 120, 130 are capable of providing elastic forces when the engaging portion 110 rotates. The first and the second elastic portions 120, 130 are symmetrically formed on opposite ends of the connecting portion 160, therefore, two elastic forces acts on two sides of the engaging force may be balance. The recess 115 in the engaging portion 110 may give way to the elements (not shown) for inserting into the voice coil motor 300.

In the voice coil motor 300, since the spring plate 100 is connected to both the fixing assembly 310 and the movable assembly 320, when the movable assembly 320 rotates, the spring plate 100 minimizes the rotation, thus avoiding camera shake.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A spring plate, used for a voice coil motor, comprising:
a connecting portion comprising, a first end and a second end opposite to the first end:
an engaging portion comprising a first edge, a second edge substantially parallel to the first edge, a third edge connecting the first edge and the second edge, and a fourth edge perpendicularly connecting the first edge and the second edge, the third edge and the connecting portion positioned at opposite sides of the fourth edge, the third edge protruding toward the fourth edge and defining a recess, the engaging portion defining a substantially U-shaped hole surrounded by the four edges;
a first elastic portion, one end of the first elastic portion connected to the first edge, and the other end of the first elastic portion connected to the first end;
a second elastic portion, one end of the second elastic portion connected to the second edge, and the other end of the second elastic portion connected to the second end;
a first fixing portion extending from the first end and apart from the first elastic portion; and
a second fixing portion extending from the second end and apart from the second elastic portion.

2. The spring plate of claim 1, wherein the first fixing portion comprises a first fixing part and a second fixing part connecting with each other, the second fixing part is connected to the first end, and the first fixing part is substantially perpendicular to the second fixing part.

3. The spring plate of claim 2, wherein the second fixing portion comprises a third fixing part and a fourth fixing part connecting with each other, the fourth fixing part is connected to the second end, and the third fixing pan is substantially perpendicular to the fourth fixing part.

4. The spring plate of claim 1, wherein the first elastic portion comprises a first elastic, part connected to the first edge, a second elastic part connected to the first end, and a first connecting part connecting the first elastic part and the second elastic part, and the first elastic part is substantially perpendicular to the second elastic part.

5. The spring plate of claim 4, wherein the second elastic portion comprises a third elastic part connected to the second edge, a fourth elastic part connected to the second end, and a second connecting part connecting the third elastic part and the fourth elastic part, and the fourth elastic part is substantially perpendicular to the third elastic part.

6. The spring plate of claim 5, wherein a length of the first elastic part of the first elastic portion is substantially equal to a length of the third elastic part of the second elastic portion.

7. The spring plate of claim 6, wherein a length of the second elastic part of the first elastic portion is substantially equal to a length of the fourth elastic part of the second elastic portion.

8. The spring plate of claim 5, wherein the first elastic portion is positioned between the engaging, portion and the first fixing portion, and the second elastic portion is positioned between the engaging portion and the second fixing portion.

9. The spring plate of claim 5, wherein one end of the first elastic part is directly connected to the first edge, one end of the second elastic part is directly connected to the first end, one end of the third elastic part is directly connected to the second edge, and one end of the fourth elastic part is directly connected to the second end.

10. A voice coil motor, comprising:
a spring plate comprising:
a connecting portion comprising a first end and a second end opposite to the first end;
an engaging portion comprising a first edge, a second edge substantially parallel to the first edge a third edge connecting the first edge and the second edge, and a fourth edge perpendicularly connecting the first edge and the second edge, the third edge and the connecting portion positioned at opposite sides of the fourth edge, the third edge protruding toward the fourth edge and defining a recess, the engaging portion defining a substantially U-shaped hole surrounded by the four edges;

a first elastic portion, one end of the first elastic portion connected to the first edge, and the other end of the first elastic portion connected to the first end;

a second elastic portion, one end of the second elastic portion connected to the second edge, and the other end of the second elastic portion connected to the second end;

a first fixing portion extending from the first end and apart from the first elastic portion; and a second fixing portion extending from the second end and apart from the second elastic portion a fixing assembly defines a first receiving space;

a movable assembly received in the first receiving space of the fixing assembly;

a rolling member rotatably positioned between the fixing, assembly and the movable assembly;

a first magnetic assembly fixed on the movable assembly; and a second magnetic assembly fixed on the movable assembly and facing the first magnetic assembly;

wherein the engaging portion of the spring plate is fixed on the movable assembly, and the first fixing portion and the second fixing portion is fixed on the fixing assembly; one of the first magnetic assembly and the second magnetic assembly is an electromagnet for generating a magnetic force to drive the movable assembly rotating around the rolling member relative to the fixing assembly.

11. The voice coil motor of claim 10, wherein a center axis of the fixing assembly is substantially perpendicular to the engaging portion of the spring plate.

12. The voice coil motor of claim 10 further comprises a third magnetic assembly and a fourth magnetic assembly facing each other.

13. The voice coil motor of claim 12, wherein the fixing assembly comprises a fixing frame having a first sidewall, a second sidewall facing the first sidewall, and a third sidewall connecting the first and the second sidewalls, the movable assembly comprises a receiving frame having a first side plate, a second side plate, and a third side plate, the first side plate, the second side plate, and the third side plate face the first sidewall, the second sidewall, and the third sidewall respectively, and the rolling member is positioned between the first sidewall and the first side plate.

14. The voice coil motor of claim 13, wherein the first magnetic assembly is fixed on the second sidewall of the fixing assembly, and the second magnetic assembly is fixed on the second side plate of the movable assembly.

15. The voice coil motor of claim 13, wherein the third magnetic assembly is fixed on the third sidewall of the fixing assembly, and the fourth magnetic assembly is fixed on the third side plate of the movable assembly.

16. The voice coil motor of claim 13, wherein the fixing assembly further comprises a fixing hoard fixed on an upper portion of the fixing frame, a first receiving recess is defined in the fixing board toward the moveable assembly, the moveable assembly further comprises a connecting board fixed on an upper portion of the receiving frame, a second receiving recess is defined in the connecting board and aligned with the first receiving recess, and the rolling member is received in the first receiving recess and the second receiving recess.

17. The voice coil motor of claim 16, wherein the receiving frame further comprises a top plate, the connecting board is L-shaped and fixed on the top plate and the first side plate, the connecting board comprises a connecting part positioned between the first side plate and the first sidewall, and the second receiving recess is defined in the connecting part.

18. The voice coil motor of claim 10, wherein the first elastic portion comprises a first elastic part connected to the first edge, a second elastic part connected to the first end, and a first connecting part connecting the first elastic part to the second elastic part, and the first elastic part is substantially perpendicular to the second elastic part.

19. The voice coil motor of claim 18, wherein the second elastic portion comprises a third elastic part connected to the second edge, a fourth elastic part connected to the second end, and a second connecting part connecting the third elastic part to the fourth elastic part, and the fourth elastic part is substantially perpendicular to the third elastic part.

20. The voice coil motor of claim 19, wherein one end of the first elastic part is directly connected to the first edge, one end of the second elastic part is directly connected to the first end, one end of the third elastic part is directly connected to the second edge, and one end of the fourth elastic part is directly connected to the second end.

* * * * *